United States Patent [19]
Argoudelis

[11] 3,857,936
[45] Dec. 31, 1974

[54] MELINACIDIN
[75] Inventor: Alexander D. Argoudelis, Portage, Mich.
[73] Assignee: The Upjohn Company, Kalamazoo, Mich.
[22] Filed: May 26, 1971
[21] Appl. No.: 146,872

[52] U.S. Cl. .................................................. 424/117
[51] Int. Cl. .......................................... H61k 21/00
[58] Field of Search .................................... 424/117

[56] References Cited
UNITED STATES PATENTS
3,639,581  2/1972  Argoudelis et al.................. 424/117

Primary Examiner—Jerome D. Goldberg
Attorney, Agent, or Firm—Roman Saliwanchik

[57] ABSTRACT

Melinacidin antibiotics named melinacidin II (U-37,992), melinacidin III (U-37,721), and melinacidin IV (U-36,834) obtained from the melinacidin antibiotic complex (U-26,362) which, in turn, is producible by culturing *Acrostalagmus cinnabarinus* var. *melinacidinus* in a nutrient medium. These melinacidin antibiotics are well characterized crystalline materials demonstrating antibacterial activity and, thus, are useful as antibacterial agents.

9 Claims, 10 Drawing Figures

INFRARED ABSORPTION SPECTRUM (NUJOL)

INFRARED ABSORPTION SPECTRUM (KBr)

NUCLEAR MAGNETIC RESONANCE SPECTRUM

INFRARED ABSORPTION SPECTRUM (NUJOL)

INFRARED ABSORPTION SPECTRUM (KBr)

NUCLEAR MAGNETIC RESONANCE SPECTRUM

INFRARED ABSORPTION SPECTRUM (NUJOL)

INFRARED ABSORPTION SPECTRUM (KBr)

NUCLEAR MAGNETIC RESONANCE SPECTRUM

PAPER CHROMATOGRAPHIC COMPARISON

MELINACIDIN

BRIEF SUMMARY OF THE INVENTION

The melinacidin antibiotics of the subject invention are obtained from the melinacidin antibiotic complex which is producible by culturing a melinacidin-producing *Acrostalagmus cinnabarinus* var. *melinacidinus* in an aqueous nutrient medium. The properties and preparation of the melinacidin antibiotic complex is disclosed in patent application Ser. No. 678,046, filed on Oct. 25, 1967, now U.S. Pat. No. 3,639,581. Melinacidin complex is a neutral substance which has the properties of adversely affecting the growth of Gram-positive and Gram-negative bacteria, for example *Bacillus subtilis*, *Staphylococcus aureus*, *Salmonella pullorum*, *Streptococcus faecalis*, and *Proteus vulgaris*, and can be used alone or in combination with other antibacterial agents to prevent the growth of, or reduce the number of, such microorganisms present in various environments. For example, it can be used as an oil preservative, for example, as a bacteriostatic agent for inhibiting the growth of *Proteus vulgaris* which is known to cause spoilage in cutting oils. Also, it is useful in wash solutions for sanitation purposes, as in the washing of hands and in the cleaning of equipment, floors, or furnishings of contaminated rooms or laboratories; it is also useful as an industrial preservative, for example, as a bacteriostatic rinse for laundered clothes and for impregnating papers and fabrics; and it is useful for suppressing the growth of sensitive organisms in plate assays and other microbiological media.

Accordingly, melinacidin can be used as a disinfectant on washed and stacked food utensils contaminated with *Staphylococcus aureus*. It also can be used in petroleum product storage to control the microorganism *Bacillus subtilis*, which is a known slime and corrosion producer in petroleum products storage.

The antibiotics of the subject application, melinacidin II, melinacidin III, and melinacidin IV also are antibacterially active as evidenced by the antibacterial spectrums disclosed hereinafter.

The isolation of these individual components from the melinacidin complex enables the realization of a greater degree of stabililzation of the antibiotic entity. Heretofore, the proportion of components in the melinacidin complex entity might be expected to vary. This would then present a problem of standardizing the entity for controlled usage of the antibiotic. The resolution of the melinacidin complex, as disclosed in the subject invention, to separate crystalline entities advances the use of these antibiotics because of their reproducibility.

BRIEF DESCRIPTION OF THE DRAWINGS

BRIEF DESCRIPTION OF THE DRAWINGS

Figure 1:
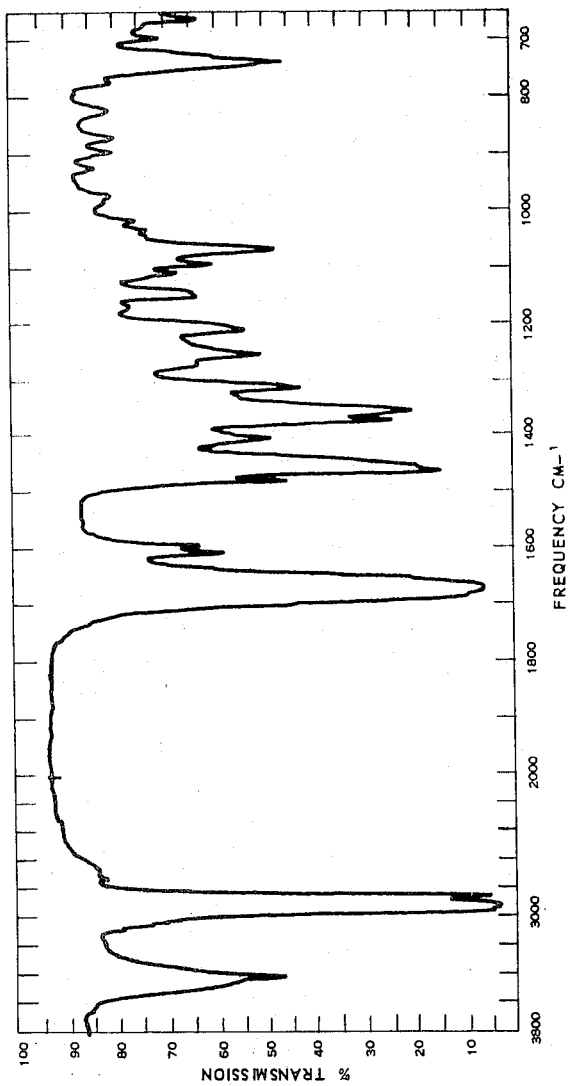
Figure 2:
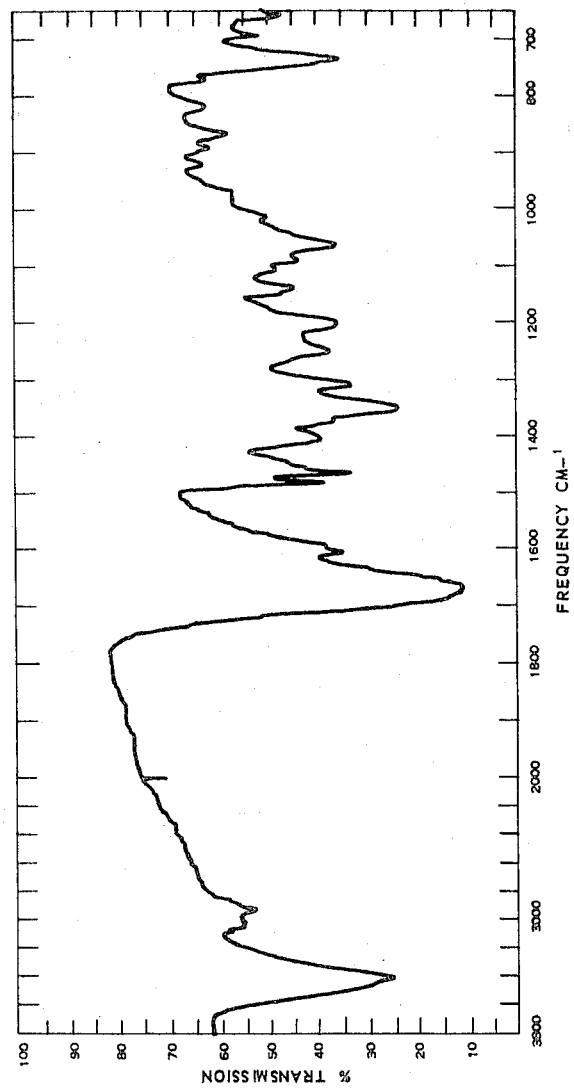
Figure 3:
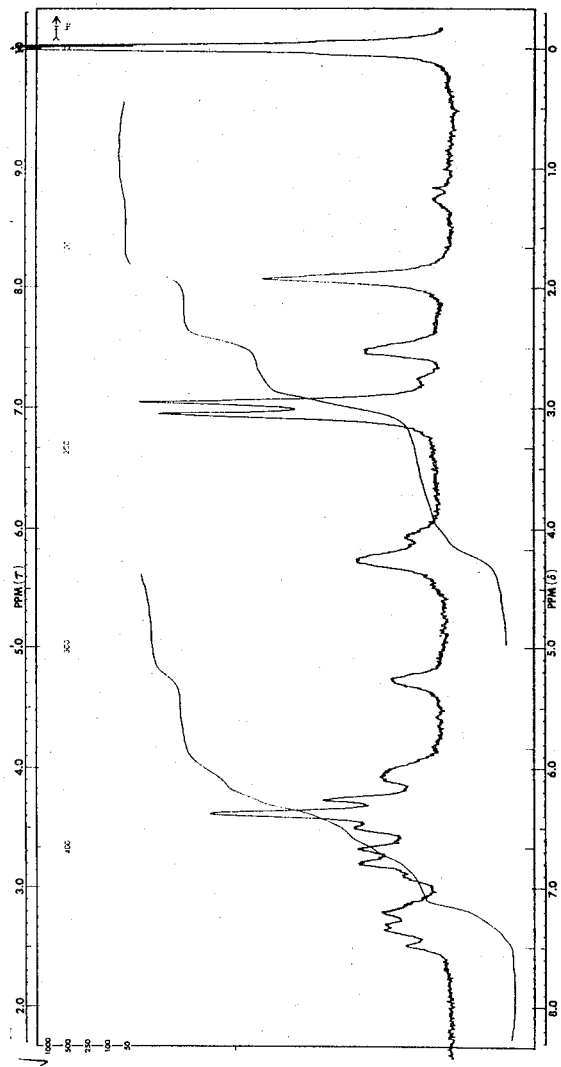
Figure 4:
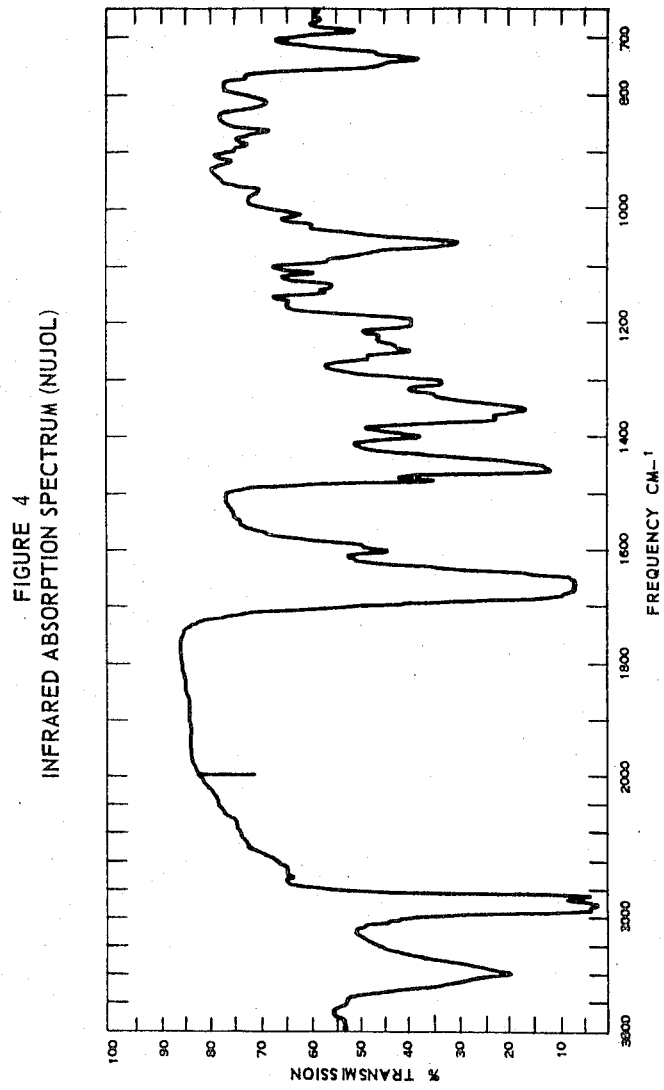
Figure 5:
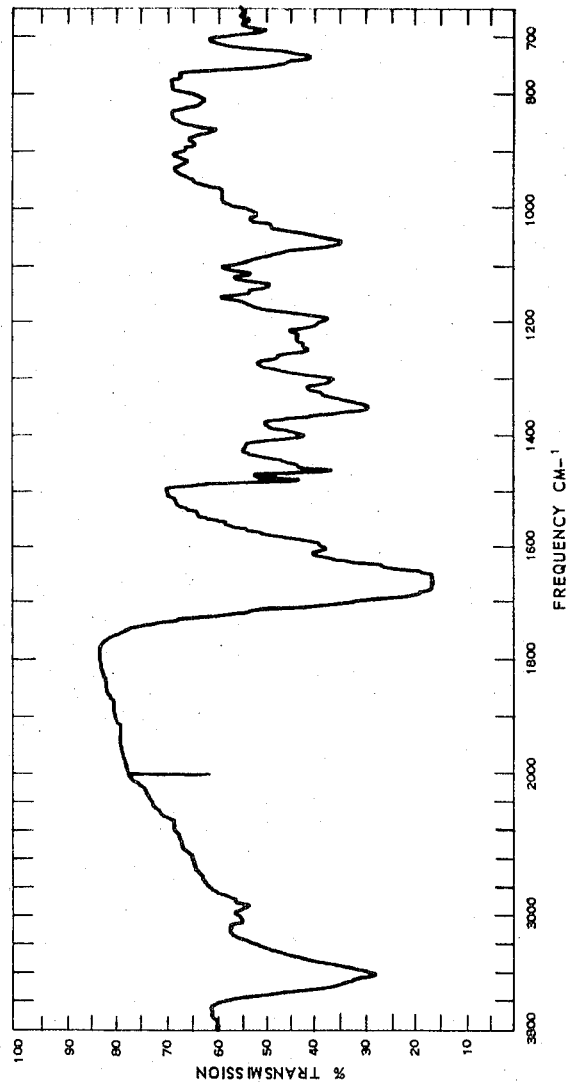
Figure 6:
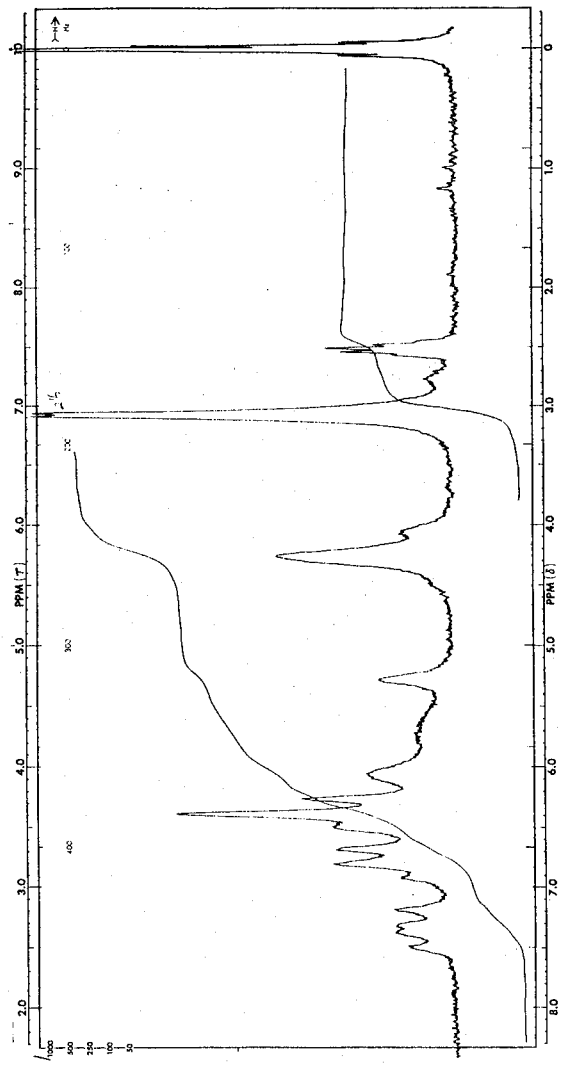
Figure 7:
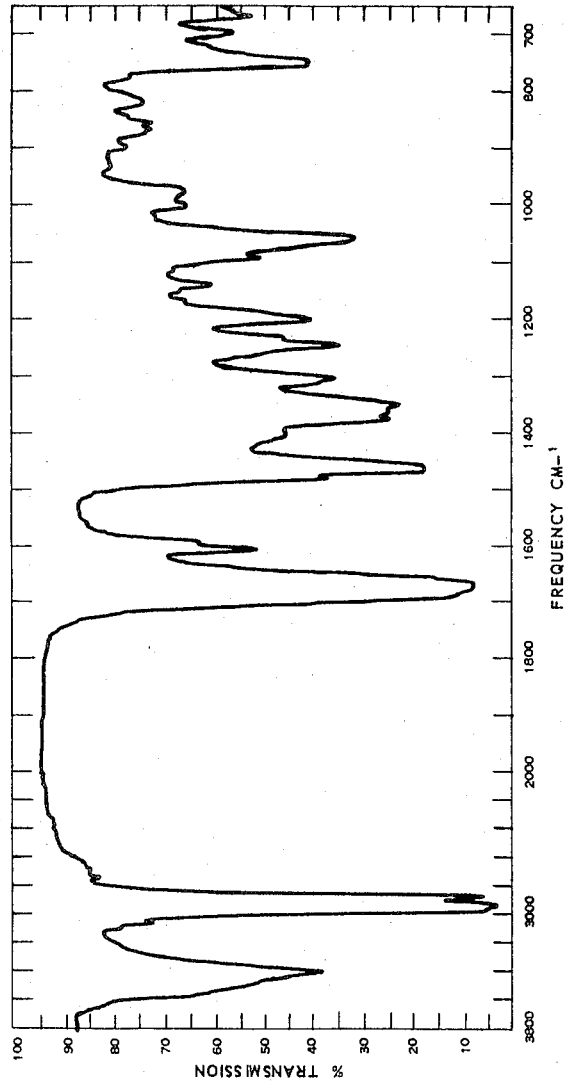
Figure 8:
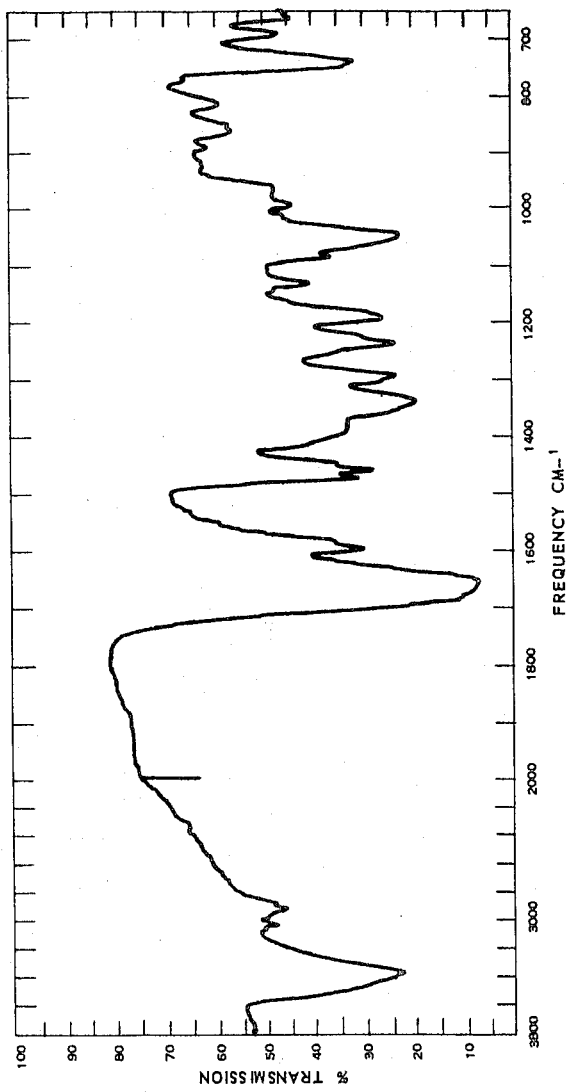
Figure 9:
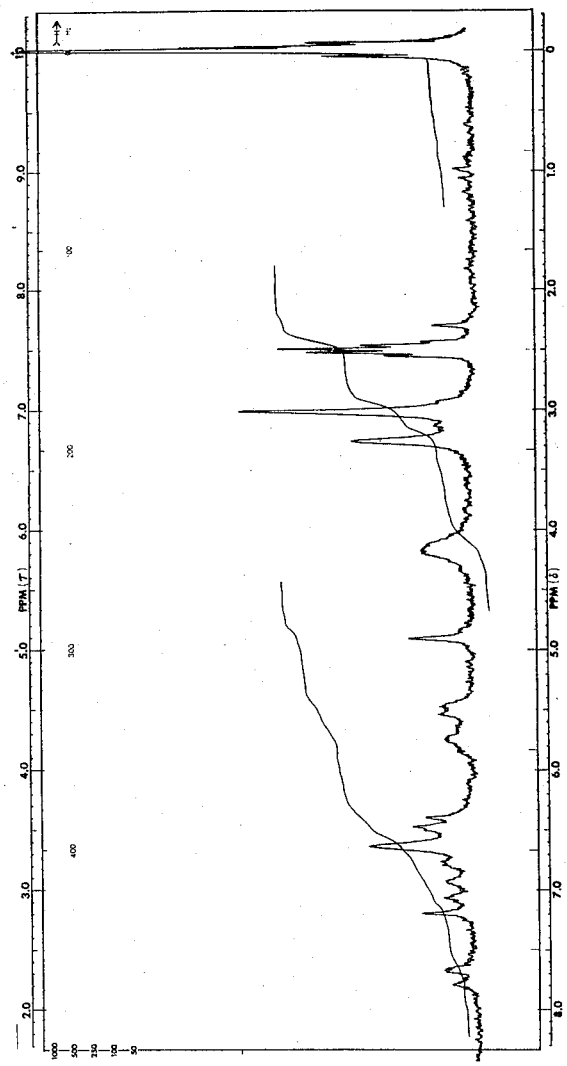
Figure 10:
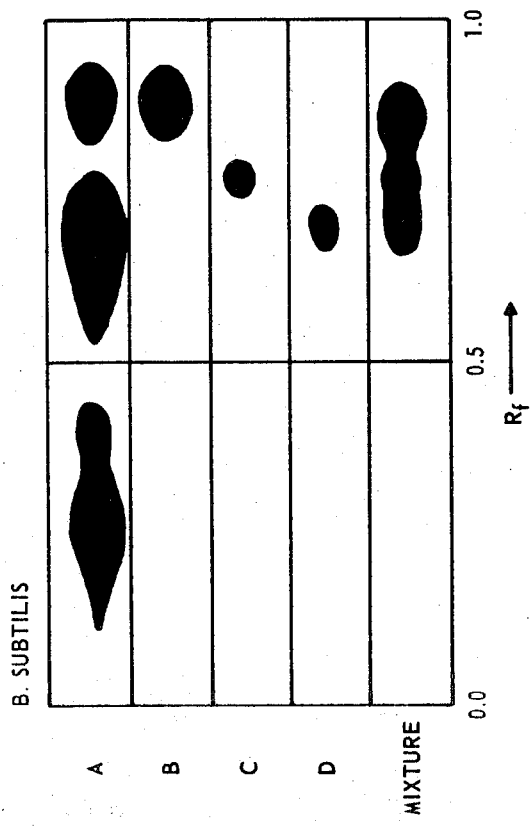

FIG. 1  Infrared Absorption Spectrum of Melinacidin II in Mineral Oil Mull (Nujol)
FIG. 2  Infrared Absorption Spectrum of Melinacidin II in KBr Disc
FIG. 3  NMR Spectrum of Melinacidin II
FIG. 4  Infrared Absorption Spectrum of Melinacidin III in Mineral Oil Mull (Nujol)
FIG. 5  Infrared Absorption Spectrum of Melinacidin III in KBr Disc
FIG. 6  NMR Spectrum of Melinacidin III
FIG. 7  Infrared Absorption Spectrum of Melinacidin IV in Mineral Oil Mull (Nujol)
FIG. 8  Infrared Absorption Spectrum of Melinacidin IV in KBr Disc
FIG. 9  NMR Spectrum of Melinacidin IV
FIG. 10 Paper Chromatography of Melinacidin Complex (A), Melinacidin II (B), Melinacidin III (D), Melinacidin IV (C), and the Mixture of Melinacidins, II, III, and IV.
Solvent system: Benzene-methanol-water (1:2:2 v/v). Development: 16 hours in upper phase. Equilibration: 16 hours with upper and lower phases.

DETAILED DESCRIPTION

Chemical and Physical Properties of Melinacidin II

Elemental Analysis:
Calc'd. for $C_{34}H_{34}N_6S_4O_6$:
  C, 54.45; H, 4.57; N, 11.21; S, 17.10; O, 12.67.
Found:
  C, 53.90; H, 4.64; N, 10.96; S, 16.99; O (by diff.); 12.71.

Molecular Weight: 855 (vapor pressure osmometry in chloroform)

Optical Rotation: $[\alpha]_D^{25} = +726°$ ($c$, 0.5, $CHCl_3$)

Ultraviolet Spectrum:
In methanol: sh at 241 m$\mu$ ($a = 21$); $\lambda$ max. at 300 m$\mu$ ($a = 7.3$)
In DMF-methanol: $\lambda$ max. at 300 m$\mu$ ($a = 6.2$)

Solubility: Melinacidin II is soluble in chloroform, methylene chloride, dimethylformamide, and dimethylsulfoxide. Melinacidin II has a lower degree of solubility in acetone and 95% ethanol, and is relatively insoluble in water and saturated hydrocarbon solvents, for example, n-hexane, cyclohexane, and isomeric hexanes.

Infrared Spectrum: The infrared absorption spectrum of melinacidin II suspended in mineral oil mull is reproduced in FIG. 1 of the drawing. Following is a tabulation of the wave lengths from FIG. 1 expressed in reciprocal centimeters.

| Band Frequency (cm⁻¹) | Band Frequency (cm⁻¹) |
|---|---|
| 3450 sh (M) | 1267 (M) |
| 3410 (M) | 1250 (M) |
| 2970 (oil) (S) | 1208 (M) |
| 2910 (oil) (S) | 1165 (W) |
| 2860 (oil) (S) | 1150 (M) |
| 1685 sh (S) | 1140 (M) |
| 1670 (S) | 1115 sh (W) |
| 1653 sh (S) | 1107 (M) |
| 1648 sh (S) | 1090 (M) |
| 1645 sh (S) | 1065 (M) |
| 1638 sh (M) | 1030 (W) |
| 1605 (M) | 1013 (W) |
| 1595 (M) | 970 (W) |
| 1480 (M) | 920 (W) |
| 1465 (oil) (S) | 892 (W) |
| 1455 (oil) (S) | 865 (W) |
| 1405 (M) | 820 (W) |
| 1378 (S) | 770 (W) |
| 1355 (S) | 735 (M) |
| 1310 (M) | 725 (M) |

The infrared absorption spectrum of Melinacidin II, when pressed in a KBr disc, is reproduced in FIG. 2 of the drawing. Following is a tabulation of the wave lengths from FIG. 2 expressed in reciprocal centimeters.

| Band Frequency (cm⁻¹) | Band Frequency (cm⁻¹) |
| --- | --- |
| 3440 sh (S) | 3040 (M) |
| 3410 (S) | 2930 (M) |
| 3080 (M) | 1670 (S) |
| 1655 SH (S) | 1138 (M) |
| 1605 (S) | 1108 (M) |
| 1595 (M) | 1090 (M) |
| 1482 (M) | 1063 (M) |
| 1465 (S) | 1015 (M) |
| 1455 (M) | 970 (M) |
| 1405 (M) | 920 (W) |
| 1372 (M) | 890 (W) |
| 1350 (S) | 865 (M) |
| 1310 (S) | 820 (M) |
| 1260 (M) | 770 (W) |
| 1250 (M) | 743 sh (M) |
| 1200 (M) | 735 (M) |
| 1148 (M) | |

Infrared band intensities, throughout this disclosure, are indicated as S, M, and W respectively and are approximated in terms of the backgrounds in the vicinity of the bands. An S band is of the same order of intensity as the strongest in the spectrum; M bands are between one-third and two-thirds as intense as the strongest band; and, W bands are less than one-third as intense as the strongest band. These estimates are made on the basis of a percent transmission scale.

Nuclear Magnetic Resonsance (NMR): Melinacidin II has a characteristic NMR spectrum as shown in FIG. 3 of the drawing. The NMR spectrum was observed on a Varian A-60 spectrometer on a solution (ca. 0.5 ml., ca. 15% concentration) of the sample of melinacidin II in $D_6$-DMSO. The spectrum was calibrated against internal tetramethylsilane and the precision of the $\Delta\nu$ was $>\pm 1$ c.p.s. Frequencies were recorded in c.p.s. downfield from tetramethylsilane.

ANTIBACTERIAL ACTIVITY OF MELINACIDIN II

| Test Microorganism | Minimum Inhibitory Concentration in mcg./ml. |
| --- | --- |
| Salmonella pullorum | 50 |
| Staphylococcus aureus | 1.0 |
| Streptococcus viridans | 10 |
| Streptococcus hemolyticus | 0.1 |
| Streptococcus faecalis | 10 |
| Proteus vulgaris | 10 |
| Escherichia coli | >100 |
| Klebsiella pneumoniae | >100 |

The above antibacterial spectrum, as well as those following, was obtained by a tube dilution assay procedure. This tube dilution assay procedure was conducted with the medium BHI (Brain Heart Infusion Broth, Difco, Detroit, Michigan). Assay tubes (13 mm. × 100 mm.) were prepared in the customary manner as set out in Snell, E. E., Vitamin Methods, Vol. 1, Academic Press, Inc., New York (1950), page 327. Test organisms grown for 18 hours at 37°C. were added to inoculate the test medium. The assays were read at 17 hours.

In vitro (tube dilution assay*) antitumor activity of melinacidin II against L1210 cells:

| | |
| --- | --- |
| $LD_{50}$ (µg./ml.) | 0.0016 |
| $LD_{90}$ (µg./ml.) | 0.0044 |

*Assay procedure disclosed in Cancer Research 30, 2760-2761, November 1970.

Chemical and Physical Properties of Melinacidin III

Elemental Analysis:
Calc'd. for $C_{32}H_{30}N_6S_4O_8$:
C, 50.97; H, 4.01; N, 11.20; S, 16.98; O, 16.86.
Found:
C, 51.49; H, 4.15; N, 11.45; S, 17.44; O (by diff.), 16.47.

Molecular Weight: 820 (vapor pressure osmometry in chloroform)

Optical Rotation: $[\alpha]_D^{25} = +776°$ (c, 0.52, CHCl₃)

Ultraviolet Spectrum:
In methanol: sh is at 240 mµ; λ max. 300 mµ (a = 7.5)
In DMF-methanol: λ max. at 300 mµ (a = 7.5)

Solubility: Melinacidin III has the same solubility properties as melinacidin II.

Infrared Spectrum: The infrared absorption spectrum of melinacidin III suspended in mineral oil mull is reproduced in FIG. 4. Following is a tabulation of the wave lengths from FIG. 4 expressed in reciprocal centimeters.

| Band Frequency (cm⁻¹) | Band Frequency (cm⁻¹) |
| --- | --- |
| 3480 sh (M) | 1665 (S) |
| 3405 (S) | 1645 sh (S) |
| 2920 (oil) (S) | 1634 sh (M) |
| 2850 (oil) (S) | 1605 (M) |
| 1685 (S) | 1595 sh (M) |
| 1480 (M) | 1115 (M) |
| 1460 (oil) (S) | 1090 sh (M) |
| 1455 (S) | 1075 sh (M) |
| 1445 sh (S) | 1060 (S) |
| 1435 sh (M) | 1030 (M) |
| 1403 (M) | 1010 (W) |
| 1370 (oil) (S) | 970 (W) |
| 1354 (S) | 918 (W) |
| 1330 sh (M) | 895 (W) |
| 1308 (M) | 887 (W) |
| 1263 (M) | 864 (W) |
| 1250 (M) | 814 (W) |
| 1245 sh (M) | 770 sh (W) |
| 1225 (M) | 745 sh (M) |
| 1200 (M) | 735 (M) |
| 1165 (W) | 725 sh (M) |
| 1148 (M) | 687 (M) |
| 1135 (M) | |

The infrared absorption spectrum of melinacidin III, when pressed in a KBr disc, is reproduced in FIG. 5 of the drawing. Following is a tabulation of the wave lengths from FIG. 5 expressed in reciprocal centimeters.

| Band Frequency (cm⁻¹) | Band Frequency (cm⁻¹) |
| --- | --- |
| 3470 sh (S) | 1665 (S) |
| 3400 (S) | 1602 (S) |
| 3030 (M) | 1592 (S) |
| 2920 (M) | 1577 (M) |
| 2880 (M) | 1461 (S) |
| 1450 sh (M) | 1055 (S) |
| 1400 (M) | 1028 (M) |
| 1350 (S) | 1009 (M) |
| 1305 (S) | 970 (M) |
| 1300 (S) | 915 (M) |
| 1260 (M) | 895 (M) |
| 1250 (M) | 887 (M) |
| 1225 (M) | 862 (M) |
| 1190 (M) | 810 (M) |
| 1145 (M) | 770 (M) |

| Band Frequency (cm⁻¹) | Band Frequency (cm⁻¹) |
| --- | --- |
| 1133 (M) | 742 sh (M) |
| AAAA (M) | 734 (M) |
| 1090 sh (M) | 685 (M) |
| 1075 sh (M) | |

Nuclear Magnetic Resonance (NMR): Melinacidin III has a characteristic NMR spectrum as shown in FIG. 6 of the drawing. The NMR spectrum was observed on a Varian A-60 spectrometer on a solution (ca. 0.5 ml., ca. 15% concentration) of the sample of Melinacidin III in $D_6$-DMSO. The spectrum was calibrated against internal tetramethylsilane and the precision of the $\Delta v$ was $>\pm 1$ c.p.s. Frequencies were recorded in c.p.s. downfield from tetramethylsilane.

ANTIBACTERIAL PROPERTIES OF MELINACIDIN III

| Test Microorganism | Minimum Inhibitory Concentration in mcq./ml. |
| --- | --- |
| Salmonella pullorum | 50 |
| Staphylococcus aureus | 0.01 – 1.0 |
| Streptococcus viridans | 10 |
| Streptococcus hemolyticus | 0.1 |
| Streptococcus faecalis | 10 |
| Proteus vulgaris | 10 |
| Escherichia coli | 50 |
| Klebsiella pneumoniae | 50 |

In vitro (tube dilution assay) antitumor activity of Melinacidin III against L1210 cells:

| $LD_{50}$ (μg./ml.) | 0.0038 |
| --- | --- |
| $LD_{90}$ (μg./ml.) | 0.0140 |

Chemical and Physical Properties of Melinacidin IV

Elemental Analysis:
Calc'd. for $C_{45}H_{45}N_9S_6O_{12}$:
 C, 49.31; H, 4.11; N, 11.51; S, 17.53; O, 17.53.
Found:
 C, 49.55; H, 4.13; N, 11.12; S, 17.45; O (by diff.), 17.28.
Molecular Weight: 1200 (vapor pressure osmometry in chloroform)
Optical Rotation: $[\alpha]_D^{25} = +718°$ (c, 0.5, CHCl₃)
Ultraviolet Spectrum:
In methanol: sh at 242 (a = 15) λ max. at 301 mμ (a = 6.0)
In DMF-methanol: λ max. at 301 mμ (a = 7.8)
Solubility: Melinacidin IV has the same solubility properties as melinacidin II.
Infrared Spectrum: The infrared absorption spectrum of melinacidin IV suspended in mineral oil mull is reproduced in FIG. 7 of the drawing. Following is a tabulation of the wave-lengths from FIG. 7 expressed in reciprocal centimeters.

| Band Frequency (cm⁻¹) | Band Frequency (cm⁻¹) |
| --- | --- |
| 3500 sh (M) | 1293 (S) |
| 3385 (M) | 1230 sh (S) |
| 2950 (oil) (S) | 1198 (M) |
| 2920 (oil) (S) | 1190 sh (M) |
| 2860 (oil) (S) | 1170 sh (M) |
| 1683 sh (S) | 1147 sh (M) |
| 1665 (S) | 1136 (M) |
| 1653 sh (S) | 1090 (M) |
| 1645 sh (S) | 1055 (S) |
| 1635 sh (S) | 1000 (M) |
| 1602 (M) | 975 (M) |
| 1590 sh (M) | 925 (W) |
| 1487 sh (M) | 896 (W) |
| 1477 (S) | 866 (W) |
| 1460 (oil) (S) | 855 (W) |
| 1400 (M) | 820 (W) |
| 1374 (S) | 752 sh (W) |
| 1363 (S) | 752 (M) |
| 1346 (oil) (S) | 747 (M) |
| 1307 sh (S) | 695 (M) |
| 1300 (S) | |

The infrared absorption spectrum of melinacidin IV, when pressed in a KBr disc, is reproduced in FIG. 8 of the drawing. Following is a tabulation of the wavelengths from FIG. 8 expressed in reciprocal centimeters.

| Band Frequency (cm⁻¹) | Band Frequency (cm⁻¹) |
| --- | --- |
| 3380 (S) | 1240 (S) |
| 3075 (M) | 1230 sh (S) |
| 3040 (M) | 1195 (S) |
| 2920 (M) | 1134 (M) |
| 2880 (M) | 1088 (M) |
| 1683 (S) | 1050 (S) |
| 1660 (S) | 1020 (M) |
| 1600 (S) | 997 (M) |
| 1590 (M) | 970 (M) |
| 1475 (S) | 894 (W) |
| 1463 (S) | 865 (M) |
| 1450 sh (M) | 853 (M) |
| 1390 (S) | 816 (M) |
| 1343 (S) | 750 sh (S) |
| 1305 sh (S) | 741 (S) |
| 1296 (S) | 730 sh (S) |

Nuclear Magnetic Resonance (NMR): Melinacidin IV has a characteristic NMR spectrum as shown in FIG. 9 of the drawing. The NMR spectrum was observed on a Varian A-60 spectrometer on a solution (ca. 0.5 ml., ca. 15% concentration) of the sample of melinacidin IV in $D_6$-DMSO. The spectrum was calibrated against internal tetramethylsilane and the precision of the $\Delta v$ was $>\pm 1$ c.p.s. Frequencies were recorded in c.p.s. downfield from tetramethylsilane.

ANTIBACTERIAL ACTIVITY OF MELINACIDIN IV

| Test Microorganism | Minimum Inhibitor Concentration in mcq./ml. |
| --- | --- |
| Salmonella pullorum | 50 |
| Staphylococcus aureus | 0.1 – 1.0 |
| Streptococcus viridans | 10 |
| Streptococcus hemolyticus | 0.1 |
| Streptococcus faecalis | 1.0 |
| Proteus vulgaris | 50 |
| Escherichia coli | 100 |
| Klebsiella pneumoniae | 100 |

In vitro (tube dilution assay) antitumor activity of melinacidin IV against L1210 cells:

LD₅₀ (μg./ml.)   0.0062
LD₉₀ (μg./ml.)   0.0170

THE MICROORGANISM

The fungus used for the production of the melinacidin complex is a new variety of a known fungus and has been named *Acrostalagmus cinnabarinus* var. *melinacidinus*. This variety is distinguished from other *Acrostalagmus cinnabarinus* by its ability to produce the melinacidin complex. A subculture of the living organism can be obtained from the permanent collection of the Northern Utilization and Research Division, Agricultural Research Service, U.S. Department of Agriculture, Peoria, Illinois, U.S.A. Its accession number in this repository is NRRL 3291.

*Acrostalagmus cinnabarinus* var. *melinacidinus* can be identified in its usual imperfect stage according to standard fungus taxonomic classification schemes, for example, F. E. Clements and C. L. Shear, "The Genera of Fungi", Hafner Publishing Co., New York (1957), page 203, and P. A. Saccardo, "Sylloge Fungorum" (1837) (lithoprinted by Edwards Brothers, Inc., Ann Arbor, Michigan (1944), Vol. 4, page 163. The species *A. cinnabarinus* was described taxonomically by A. C. J. Corda, "Icones Fungorum" (1837), page 15. For some strains of this species the perfect stage of growth has also been observed and on this basis they have been classified also as *Nectria Inventa*, however the perfect stage of *A. cinnabarinus* var. *melinacidinus*, NRRL 3291, has not been observed.

The melinacidin antibiotics of the subject invention can be isolated from a preparation of the melinacidin complex by first recrystallizing the melinacidin complex preparation from a suitable solvent mixture, for example, dimethylformamide, chloroform, and ethanol. The recrystallized melinacidin complex can be further treated with a suitable solvent mixture to remove insoluble impurities. For example, upon treating a recrystallized preparation of melinacidin complex with a mixture of chloroform and ethanol at a temperature of about 70°C., there is obtained melinacidin complex crystals free of insoluble impurities. The filtrate containing the essentially pure crystalline melinacidin complex is cooled to afford substantially pure melinacidin complex crystals. Further crystals can be obtained by concentrating the remaining filtrate and crystallizing the melinacidin complex crystals with a suitable solvent, for example, ethanol, ethanol-chloroform, or ethanol-methylene chloride. The crystalline preparations, obtained by the above procedures, when subjected to thin-layer chromatography on silica gel G (E. Merck, Ag Darmstadt) using toluene-ethyl acetate (1:1 v/v) or methylene chloride-ethyl acetate (70:30 v/v) as solvent systems shows the presence of melinacidins II and III. These melinacidins can be separated by the use of silica gel chromatography. The chromatographic column is prepared from silica gel packed in a suitable solvent system, for example, toluene-ethyl acetate (3:1 v/v) or methylene chloride-ethyl acetate (8:2 v/v).

Melinacidin IV can be recovered from the melinacidin complex by use of counter double current distribution. For example, the melinacidin complex preparation is first dissolved in a suitable solvent mixture, for example, ethyl acetate-95% aqueous ethanol-water and cyclohexane (1:1:1:1). The two-phase solution is then subjected to a sufficient number of transfers in an all glass counter double current distribution apparatus. Fractions are collected and analyzed by thin-layer chromatography and spotting on *Bacillus subtilis* seeded agar trays. Fractions having the greatest amounts of melinacidin IV, as determined by this test, are combined and subjected to countercurrent distribution to isolate melinacidin IV in crystalline pure form.

The following examples are illustrative of the process and products of the present invention but are not to be construed as limiting. All percentages are by weight and solvent mixture proportions are by volume unless otherwise noted.

PREPARATION OF MELINACIDIN COMPLEX

Part A. Fermentation

A soil stock of *Acrostalagmus cinnabarinus* var. *melinacidinus*, NRRL 3291, is used to inoculate a series of 500-ml. Erlenmeyer flasks, each containing 100 ml. of sterile, preseed medium consisting of the following ingredients:

| | |
|---|---|
| Glucose monohydrate | 25 g./liter |
| Pharmamedia* | 25 g./liter |
| Tap water q.s. | Balance |

*Pharmamedia is an industrial grade of cottonseed flour produced by Trader's Oil Mill Company, Fort Worth, Texas.

The flasks are grown for 4 days at 25°C. on a Gump rotary shaker operating at 250 rpm.

Three shake flasks (300 ml.) of the preseed inoculum, described above, are used to inoculate a 300-liter seed tank containing 250 liters of the following sterile seed medium:

| | | |
|---|---|---|
| Lactose | 20 | g./liter |
| Glucose monohydrate | 5 | g./liter |
| Urea | 1 | g./liter |
| KH₂PO₄ | 0.5 | g./liter |
| MgSO₄ | 0.25 | g./liter |
| Distiller's solubles | 40 | g./liter |
| UCON antifoam | 100 | ml./tank |

The seed tank is agitated with an impeller rotating at 280 rpm. Sterile air is supplied at the rate of 80 liters/minute and the tank is incubated at 25°C. The seed is grown for 48 hours.

The seed tank, described above, is used to inoculate a 7000-liter fermentation tank containing 5000 liters of the following sterile medium:

| | |
|---|---|
| Blackstrap molasses | 25 g./liter |
| Yellow cornmeal | 25 g./liter |
| UCON | 5 liters |
| Tap water | Balance |

The fermentor is agitated with an impeller revolving at the rate of 166 rpm, and sterile air is supplied to the fermentor at the rate of 80 cu. ft./minute. The fermentor is maintained for 5 days at a temperature of 25°C. At 114 hours, the fermentor broth assays 86 biounits/ml. of melinacidin against the microorganism *Bacillus subtilis*. The *Bacillus subtilis* assay is a disc plate assay on synthetic agar. Samples of antibiotic to be assayed are diluted with phosphate buffer at pH 7.85. The ingredients of the synthetic agar are as follows:

| | | |
|---|---|---|
| $Na_2HPO_4 \cdot 7H_2O$ | 1.5 | gm. |
| $KH_2PO_4$ | 4.3 | gm. |
| $(NH_4)_2SO_4$ | 1.0 | gm. |
| $MgSO_4$ | 0.1 | gm. |
| Glucose | 2.0 | mg. |
| Agar | 15.0 | gm. |
| Distilled water | 1 | liter |
| Metallic ion stock solution[a] | 1 | ml. |
| Final pH | 6.2 | |

[a]Metallic ion stock solution

| Compound | Concentration |
|---|---|
| $NaMoO_4 \cdot 2H_2O$ | 200 mcg./ml. |
| $CoCl_2$ | 100 mcg./ml. |
| $CuSO_4$ | 100 mcg./ml. |
| $MnSO_4$ | 2 mg./ml. |
| $CaCl_2$ | 25 mg./ml. |
| $FeCl_2 \cdot 4H_2O$ | 5 mg./ml. |
| $ZnCl_2$* | 5 mg./ml. |

*$ZnCl_2$ has to be dissolved separately using a drop of 0.1 N HCl for 10 ml. of water.

The stock solution is heated to bring all the compounds in solution, kept standing for 24 hours and sterile filtered.

The molten agar is seeded with an overnight culture of the microorganism, poured into a 20 × 50 cm. plastic tray and allowed to solidify. The fermentation beers to be tested are applied onto 12.7 mm. paper discs and these are placed on the surface of the seeded agar and incubated at 37° for 18 hours.

A biounit is that amount of antibiotic, when dissolved in 0.08 ml. of the test solution and applied to a 12.7 mm. disc, which gives a 20 ml. zone of inhibition under standard microbiological assay conditions. Thus, if for example a fermentation beer has to be diluted 1/100 to give the 20 mm. zone of inhibition, the potency of such beer is 100 BU per ml.

Part B. Recovery

Whole beer (4700 liters assaying 210 biounits/ml. against the microorganism *Bacillus subtilis*) from a melinacidin fermentation, as described above, is filtered using diatomaceous earth as a filter aid. The clear beer is adjusted to pH 7.0 with an aqueous sulfuric acid solution. Sodium chloride (500 lbs.) is added to the clear beer. The clear beer is then extracted batch-wise with three 1200-liter portions of methylene chloride. Emulsions are separated on a Titan centrifuge. The methylene chloride extracts are pooled, washed with 50 liters of water, and then concentrated to a volume of 4 liters. This concentrate is added to 200 liters of Skellysolve B. The resulting precipitated material (crude melinacidin) is then isolated by filtration and dried; yield, 96 g. of crude melinacidin assaying 20 biounits/mg. on the *Bacillus subtilis* assay.

Part C. Purification

The crude preparation of melinacidin, disclosed above, is purified by the use of a Florisil column which is prepared from 4200 g. of Florisil packed in Skellysolve B (isomeric hexanes). (The internal diameter of the column is 4 inches.) The preparation of melinacidin (96 g.) is dissolved in acetone and methylene chloride and this solution is mixed with 340 g. of Florisil (a synthetic silicate of the type described in U.S. Pat. No. 2,393,625 and sold by the Floridin Co.). This mixture is then concentrated to dryness and the dry residue is added on the top of the Florisil column bed. The column is then eluted as follows:

1. 5 liters of Skellysolve B — The fraction resulting from this elution is discarded.
2. 20 liters of acetone-Skellysolve B (30:70 v/v) — The fraction resulting from this elution is also discarded.
3. 50 liters of acetone-Skellysolve B (60:40 v/v) — The fraction resulting from this elution is concentrated to dryness; yield, 62.8 g. of melinacidin assaying 128 biounits/mg. against the microorganism *Bacillus subtilis*. Two grams of this preparation of melinacidin is dissolved in 100 ml. of acetone. The solution is clarified by filtration and the clarified filtrate is concentrated to dryness. The residue is then triturated with 15 ml. of 95% ethanol. Crystallization of melinacidin starts almost immediately. Melinacidin crystals are isolated by filtration, washed with 5 ml. of 95% ethanol and dried; yield, 600 mg.

EXAMPLE 1

Preparation of Melinacidin II and III

Melinacidin complex (100 g.), prepared as described above, is dissolved in 200 ml. of dimethylformamide. To this solution is added 4.5 l. of 95% ethanol and 4.75 l. of water. The mixture is allowed to stand at room temperature for 24 hours. The resulting precipitated crystalline material is isolated by filtration and dried; yield, 42 g. of Preparation A. This material, as determined by silica gel G thin-layer chromatography using a solvent system consisting of methylene chloride-ethyl acetate (80:20 v/v) is shown to be a mixture of components of the melinacidin complex.

Preparation A (42 g.) is then dissolved in 1050 ml. of chloroform and 840 ml. of ethanol under heating on a steam bath. Insoluble material is separated by filtration and discarded. The filtrate is concentrated to a volume of 1100 ml. Resulting precipitated crystalline material is filtered and dried; yield, 3.15 g. of Preparation B. Additional crystalline material is obtained by cooling the remaining filtrate. This material is also isolated by filtration; yield, 6.50 g. of Preparation C. The remaining filtrate is concentrated to a volume of 850 ml. Ethanol (95%) (450 ml.) is added and the mixture is allowed to stand at room temperature for 12 hours. The resulting precipitated crystalline material is isolated by filtration and dried; yield, 2.0 g. of Preparation D.

Preparations B, C, and D, disclosed above, are combined to give preparation E (11.6 g.) which, as determined by thin-layer chromatography, as disclosed above, contains mainly melinacidins II and III. Preparation E is then subjected to silica gel chromatography to separate melinacidins II and III.

The chromatographic column is prepared from 2 Kg. of silica gel (E. Merck, AG Darmstadt Art. 7734) packed in the solvent system consisting of toluene-ethyl acetate (3:1 v/v). A portion of Preparation E (6.0 g.) is dissolved in 2 l. of chloroform. This solution is mixed with 100 g. of silica gel and the mixture is concentrated to dryness. The resulting powder is added on the top of the silica gel column. The column is then eluted with the solvent system toluene-ethyl acetate (3:1 v/v). Fractions (2 l. each) are analyzed by thin-layer chromatography using toluene-ethyl acetate (1:1 v/v) or methylene chloride-ethyl acetate (70:30 v/v) as solvent systems, and ultraviolet spectra in order to determine the presence of melinacidins II and III.

In the chromatographic separation of the subject example, the first six fractions of 2 l. each are discarded. Fractions 7-14 are combined and the solution is concentrated to a volume of 25 ml. The resulting precipitated crystalline material is isolated by filtration and dried; yield, 750 mg. of melinacidin II.

Fraction 15 of the above column is discarded. Fractions 16 and 17 are combined and concentrated to a volume of 25 ml.; yield, 350 mg. containing mainly melinacidin III and traces of melinacidin II.

Fractions 18, 19, and 20 are combined and concentrated to a volume of 25 ml. The resulting precipitated crystalline material is isolated by filtration and dried; yield, 1050 mg. of melinacidin III.

EXAMPLE 2

Preparation of Melinacidin IV

A preparation of the melinacidin complex (5.0 g.) is dissolved in a mixture of 250 ml. of ethyl acetate, 250 ml. of 95% ethanol, 250 ml. of water, and 250 ml. of cyclohexane. The two-phase solution is added in the 10 center tubes of an all glass counter double current distribution apparatus. After 40 transfers using the same as above 4-solvent components system, the upper and lower phase coming out of the apparatus is collected in fractions of 25 ml. each. A total of 50 fractions of upper and 50 fractions of lower phase are collected. Selected fractions in both collectors or inside the distribution apparatus are analyzed by thin-layer chromatography, using a solvent system consisting of toluene-ethyl acetate (2:1 v/v) or methylene chloride-ethyl acetate (70:30 v/v), and spotting on *Bacillus subtilis* seeded agar trays. The following preparations are obtained:

1. Fractions 15-50 of the upper phase collector are combined and the solution is concentrated to dryness; yield, 1.0 g. of Preparation F.
2. Fractions 5-50 of the upper phase side of the apparatus are combined and concentrated to a volume of approximately 550 ml. The resulting precipitated material is isolated by filtration and dried; yield, 2.1 g. of Preparation G.

Preparations F and G are combined to give 3.1 g. of Preparation H. This material, when analyzed by thin-layer chromatography using the solvent systems described above, is found to contain melinacidin IV. This preparation is purified further by counter current distribution as described below.

Melinacidin IV Preparation H (3.0 g.) is dissolved in 500 ml. (250 ml. from each phase) of the solvent system consisting of cyclohexane-ethyl acetate-95% ethanol-water (1:1:1:1 v/v). Insoluble material is separated by filtration and discarded. The remaining clear solution is put in 25 tubes of an all glass 10 ml. per phase, 500 tubes, counter current distribution apparatus. The distribution is stopped after the completion of 500 transfers. At that point, thin-layer chromatography on silica gel G, using the solvent system consisting of toluene-ethyl acetate (2:1 v/v), shows that most of the solid material is between tubes 300-500 and that only partial separation of melinacidin IV from the other melinacidin components has been achieved.

Tubes 0-300 are emptied, cleaned and refilled with new solvent consisting of cyclohexane-ethyl acetate-95% ethanol-water (1:1:1:1 v/v). The distribution is then continued by recycling for an additional 500 transfers. The effect of the distribution is analyzed by thin-layer chromatography on silica gel G using the solvent system toluene-ethyl acetate (2:1 v/v). The contents of tubes numbered 180-230 are combined and the solution is concentrated to dryness; yield, 350 mg. of a mixture of melinacidin complex components other than melinacidin IV. The contents of tubes numbered 260-300 are combined and the solution is concentrated to a small volume of approximately 5 ml. Toluene (50 ml.) is then added and the mixture is concentrated to a volume of 10 ml. The resulting crystalline material which precipitates is isolated by filtration and dried; yield, 300 mg. of pure melinacidin IV as determined by thin-layer chromatography, as described above.

I claim:

1. A composition of matter, melinacidin II, which:
   a. is effective in inhibiting the growth of Gram-positive and Gram-negative bacteria;
   b. is soluble in chloroform, methylene chloride, dimethylformamide, and dimethylsulfoxide; and is relatively insoluble in water;
   c. has the following elemental analysis: C, 53.90; H, 4.64; N, 10.96; S, 16.99; O, 12.71 (by difference);
   d. has an ultraviolet absorption maxima in methanol at 300 m$\mu$ ($a = 7.3$), and an ultraviolet absorption maxima in dimethylformamide-methanol at 300 m$\mu$ ($a = 6.2$);
   e. has an optical rotation $[\alpha]_D^{25} = +726°$ (c, 0.5, CHCl$_3$);
   f. has a characteristic infrared absorption spectrum in mineral oil mull as shown in FIG. 1 of the accompanying drawing;
   g. has a characteristic infrared absorption spectrum when pressed in a KBr disc as shown in FIG. 2 of the accompanying drawing;
   h. has a characteristic NMR spectrum as shown in FIG. 3 of the accompanying drawing; and,
   i. has a molecular weight of 855 as determined by vapor pressure osmometry in chloroform.

2. Melinacidin II, as defined in claim 1, in its essentially pure form.

3. Melinacidin II, as defined in claim 1, in its essentially pure crystalline form.

4. A composition of matter, melinacidin III, which:
   a. is effective in inhibiting the growth of Gram-positive and Gram-negative bacteria;
   b. is soluble in chloroform, methylene chloride, dimethylformamide, and dimethylsulfoxide; and is relatively insoluble in water;
   c. has the following elemental analysis: C, 51.49; H, 4.15; N, 11.45; S, 17.44; O, 16.47 (by difference);
   d. has an ultraviolet absorption maxima in methanol at 300 m$\mu$ ($a = 7.5$);
   e. has an optical rotation $[\alpha]_D^{25} = +776°$ (c, 0.52, CHCl$_3$);
   f. has a characteristic infrared absorption spectrum in mineral oil mull as shown in FIG. 4 of the accompanying drawing;
   g. has a characteristic infrared absorption spectrum when pressed in a KBr disc as shown in FIG. 5 of the accompanying drawing;
   h. has a characteristic NMR spectrum as shown in FIG. 6 of the accompanying drawing; and,
   i. has a molecular weight of 820 as determined by vapor pressure osmometry in chloroform.

5. Melinacidin III, as defined in claim 4, in its essentially pure form.

6. Melinacidin III, as defined in claim 4, in its essentially pure crystalline form.

7. A composition of matter, melinacidin IV, which:
a. is effective in inhibiting the growth of Gram-positive and Gram-negative bacteria;
b. is soluble in chloroform, methylene chloride, dimethylformamide, and dimethylsulfoxide; and is relatively insoluble in water;
c. has the following elemental analysis: C, 49.55; H, 4.13; N, 11.12; S, 17.47; O, 17.28 (by difference);
d. has an ultraviolet absorption maxima in methanol at 301 m$\mu$ ($a = 6.0$), and an ultraviolet absorption maxima in dimethylformamide-methanol at 301 m$\mu$ ($a = 7.8$);
e. has an optical rotation $[\alpha]_D^{25} = +718°$ ($c$, 0.5, CHCl$_3$);
f. has a characteristic infrared absorption spectrum in mineral oil mull as shown in FIG. 7 of the accompanying drawing;
g. has a characteristic infrared absorption spectrum when pressed in a KBr disc as shown in FIG. 8 of the accompanying drawing;
h. has a characteristic NMR spectrum as shown in FIG. 9 of the accompanying drawing; and,
i. has a molecular weight of 1200 as determined by vapor pressure osmometry in chloroform.

8. Melinacidin IV, as defined in claim 7, in its essentially pure form.

9. Melinacidin IV, as defined in claim 7, in its essentially pure crystalline form.

* * * * *